(12) United States Patent
Marino

(10) Patent No.: US 7,149,916 B1
(45) Date of Patent: Dec. 12, 2006

(54) METHOD FOR TIME-DOMAIN SYNCHRONIZATION ACROSS A BIT-SLICED DATA PATH DESIGN

(75) Inventor: John Marino, Mountain View, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 474 days.

(21) Appl. No.: 10/763,852

(22) Filed: Jan. 22, 2004

Related U.S. Application Data

(60) Provisional application No. 60/455,490, filed on Mar. 17, 2003.

(51) Int. Cl.
*G06F 1/12* (2006.01)
(52) U.S. Cl. .................. 713/600; 713/400; 365/233
(58) Field of Classification Search ............ 713/400, 713/600; 327/144, 145; 365/233
See application file for complete search history.

(56) References Cited

U.S. PATENT DOCUMENTS

| | | | | |
|---|---|---|---|---|
| 5,654,988 A | * | 8/1997 | Heyward et al. | 375/355 |
| 5,784,323 A | * | 7/1998 | Adams et al. | 365/201 |
| 5,784,705 A | * | 7/1998 | Leung | 711/169 |
| 5,857,005 A | * | 1/1999 | Buckenmaier | 375/357 |
| 5,905,766 A | * | 5/1999 | Nguyen | 375/354 |
| 6,000,037 A | * | 12/1999 | Herbert | 713/400 |
| 6,029,253 A | * | 2/2000 | Houg | 713/600 |
| 6,033,441 A | * | 3/2000 | Herbert | 713/375 |
| 6,134,155 A | * | 10/2000 | Wen | 365/189.04 |
| 6,327,207 B1 | * | 12/2001 | Sluiter et al. | 365/221 |
| 6,470,475 B1 | * | 10/2002 | Dubey | 716/1 |
| 6,493,818 B1 | * | 12/2002 | Robertson | 712/27 |
| 6,516,420 B1 | * | 2/2003 | Audityan et al. | 713/400 |
| 6,718,449 B1 | * | 4/2004 | Phi | 711/167 |
| 6,978,344 B1 | * | 12/2005 | Schauer | 711/110 |

OTHER PUBLICATIONS

Cai et l., "A Data Path Layout Assembler for High Performance DSP Circuits", 27th ACM/IEEE Design Automation Conference, 1990, pp. 306-311.*

* cited by examiner

*Primary Examiner*—Chun Cao
(74) *Attorney, Agent, or Firm*—Townsend and Townsend and Crew LLP

(57) ABSTRACT

A bit slice data path design is provided. Multiple chips are coupled to a data bus and configured to process a slice of data for the data bus. One chip in the design is designated as a master chip and the other chips are designated as slaves. A master chip sends a signal from a first time domain to a second time domain through a synchronization circuit. When the signal has been synchronized to the frequency of the second time domain, the signal is sent to the slave chips through a connection. The signal is also looped back to the second time domain in the master chip so that the signal reaches the second time domain in the master and slave chips in the same clock cycle.

18 Claims, 5 Drawing Sheets

METHOD FOR TIME-DOMAIN SYNCHRONIZATION ACROSS A BIT-SLICED DATA PATH DESIGN

CROSS-REFERENCES TO RELATED APPLICATIONS

This application claims priority to U.S. Provisional Application No. 60/455,490, filed Mar. 17, 2003, which is incorporated herein by reference for all purposes.

BACKGROUND OF THE INVENTION

The present invention generally relates to a bit slice data path design and more specifically to techniques for synchronizing signals that cross two different time domains for chips in a bit slice data path design.

The bit slice data path design includes multiple chips that are coupled to a common data bus. The multiple chips are used to process a slice of data for the data bus. Multiple chips are used to operate on a large data bus that is too wide to fit into a single chip because a single chip cannot handle the processing of data for the entire data bus.

Each of the multiple chips process data on the same clock-for-clock cycle. A problem is introduced if the data has to synchronously cross a time domain across all data slices. For example, a first time domain operating in a first frequency may send a signal to a second time domain operating in a second frequency. In order for the first time domain to communicate with the second time domain, the signal is sent through a synchronization circuit that synchronizes the signal in the first frequency to a signal in the second frequency. A problem is introduced because the signal should cross from the first time domain to the second time domain in all slices at the same time. If the signal does not cross a time domain in all chip slices at the same time, data corruption may result.

When a signal is sent from the first time domain to the second time domain in all chip slices of the bit slice design, the signals may not be received at the second time domain in the same clock period for all the chips. Various factors may occur to cause signals to cross the time domains at different clock periods. For example, the time to synchronize the signal may vary among the chips. For example, a synchronization circuit of a first chip may take two clock cycles and a synchronization circuit of a second chip may take three clock cycles to synchronize the signal. Thus, the signal may arrive at the second time domain for the two chips at different times. Then, the two chips may not be processing data on the same clock cycle, which may result in errors.

Accordingly, techniques for synchronizing a signal from a first time domain to a second time domain across multiple chips in a bit slice design are desired.

BRIEF SUMMARY OF THE INVENTION

Embodiments of the present invention generally relate to a bit slice data path design. Multiple chips are coupled to a data bus and configured to process a slice of data for the data bus. One chip in the design is designated as a master chip and the other chips are designated as slaves. A master chip sends a signal from a first time domain to a second time domain through a synchronization circuit. When the signal has been synchronized to the frequency of the second time domain, the signal is sent to the slave chips through a connection. The signal is also looped back to the second time domain in the master chip so that the signal reaches the second time domain in the master and slave chips in the same clock cycle.

In one embodiment, a bit slice circuit is provided. The circuit comprises: a data bus; and a plurality of chips coupled to the data bus, the plurality of chips configured to simultaneously process a slice of data for the data bus. The plurality of chips includes a master chip that comprises: a first time domain circuit operating at a first frequency; a second time domain circuit operating at a second frequency; and a synchronizing circuit configured to synchronize a signal from the first time domain in the first frequency to the second time domain in the second frequency. The plurality of chips also includes one or more slave chips that comprise the second time domain circuit operating at the second frequency. Also, the master chip is configured to send the synchronized signal to one or more slave chips such that the synchronized signal is received in the second time domain circuit for the master chip and the second time domain circuit in one or more slave chips in the same clock cycle.

In another embodiment, a bit slice circuit is provided. The circuit comprises: a plurality of chips configured to simultaneously process a slice of data for a data bus where the chips including substantially similar circuitry. The plurality of chips comprise: a first time domain circuit operating at a first frequency; a second time domain circuit operating at a second frequency; a synchronization circuit configured to synchronize a signal from the first time domain in the first frequency to the second time domain in the second frequency; and an input pin configured to be set to a first or second value. The plurality of chips comprise a master chip with an input pin set to the first value and one or more slave chips with an input pin set to the second value, wherein the master chip is configured to send the synchronized signal to one or more slave chips such that the synchronized signal is received in the second time domain circuit for the master chip and the second time domain circuit in one or more slave chips in the same clock cycle.

A further understanding of the nature and advantages of the invention herein may be realized by reference of the remaining portions in the specifications and the attached drawings.

DETAILED DESCRIPTION OF THE INVENTION

Figure 1:
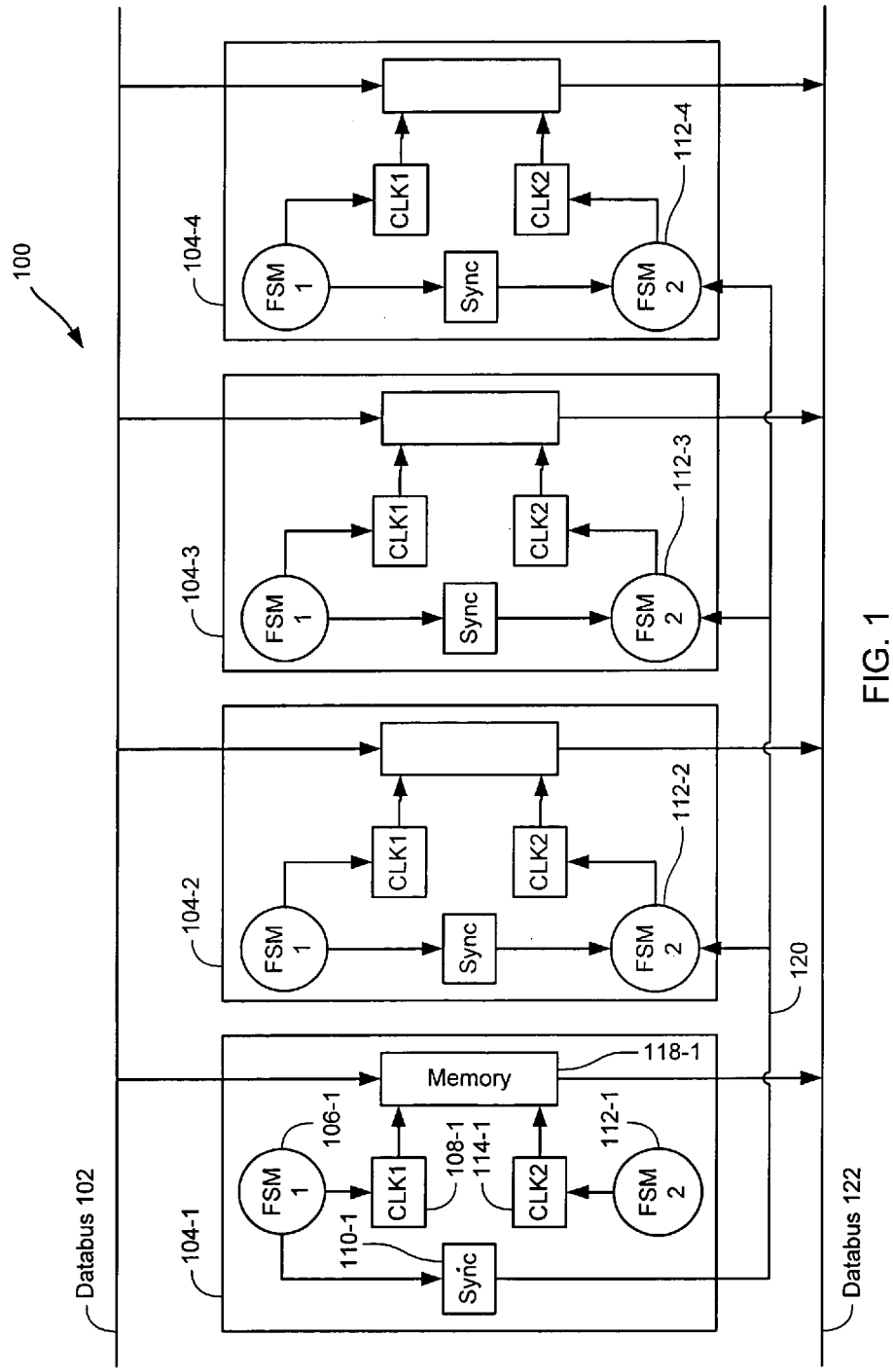
FIG. 1 depicts a bit slice data path design according to one embodiment of the present invention.

FIG. 1 depicts a bit slice data path design 100 according to one embodiment of the present invention. As shown, a data bus 102, a data bus 122, and a plurality of chips 104 are provided. The plurality of chips are depicted as a master chip 104-1 and a plurality of slave chips 104-2, 104-3, and 104-4. Although four chips are shown, it will be understood that any number of chips may be included in bit slice data path design 100.

In one embodiment, each chip 104 in system 100 is designed with substantially the same circuitry. Although it will be described that each chip 104 includes the same circuitry, it will be understood that variations in the circuitry may exist. However, it will be recognized that the chips in a bit slice design are designed to process data for a slice of the data bus on the same clock cycle.

Master chip 104-1 includes a first time domain that includes a finite state machine 106-1 and a clock (CLK1) 108-1. A synchronization circuit 110-1 is used to synchronize signals from a finite state machine (FSM1) 106-1 that are intended for a second finite state machine (FSM2) 112-1 in a second time domain. The second time domain includes a second clock (CLK2) 114-1 that operates at a different frequency than the CLK1. Signals from FSM1 106-1 to FSM2 112-1 are sent through a synchronization circuit 116-1. Although finite state machines are discussed, it will be understood that other circuitry may be used in place of a finite state machine, such as counters, FIFOs, RAMs, and the like.

A memory 118-1 is configured to stored data received from data bus 102. The stored data is then read out to a data bus 122. In one embodiment, memory 118-1 may be a first in/first out (FIFO) memory.

In one embodiment, data is read into memory 118-1 in a first time domain at a first frequency and read out of memory 118-1 in a second time domain at a second frequency. The command to read data may be received from FSM1 106-1. The data is read in at a first frequency of CLK1 108-1. When the appropriate amount of data has been read into memory 118-1, the data should be read out of memory 118-1 onto data bus 122. When this is desired, FSM1 106-1 sends a signal to FSM2 112-1 to indicate that data in memory 118-1 should be read out and written to data bus 122. The data is read out of memory 118-1 at a second frequency of CLK2 114-1 in the second time domain.

In order for FSM2 112-1 to start reading data out of memory 118-1, a control signal is sent from FSM 1106-1 to FSM2 112-1 through synchronization circuit 116-1. Synchronization circuit 116-1 is configured to convert a signal in a first frequency to a signal in a second frequency. Because the first time domain operates in a frequency different from the second time domain, a control signal that is sent in the first frequency is synchronized with the frequency in the second time domain. If synchronization does not occur, a control signal sent to the second time domain may not be recognized because of the difference in clock frequencies. For example, if the first time domain operates in a high frequency, the control signal may be a short pulse that will not overlap any of the clock signals in the second time domain.

Each chip 104-1, 104-2, 104-3, and 104-4 should receive a control signal sent from FSM1 106-1 to FSM2 112-1 in the same clock cycle. In one embodiment, master chip 104-1 is configured to send the control signal from FSM1 106-1 through synchronization circuit 116-1 to FSM2 112-1. Instead of having the control signal sent from the first time domain to the second time domain through the synchronization circuit of slave chips 104-2, 104-3, and 104-4, the synchronized signal is sent through a connector 120 to each FSM2 112-2, 112-3, and 111-4 of chips 104-2, 104-3, and 104-4. In master chip 104-1, after the signal is sent through synchronization circuit 116-1, it is looped back or delayed so that the signal reaches FSM2 112-1 at the same time as the signal reaches FSM2 112-2, 112-3, and 112-4.

Thus, the signal is received at the second time domain of each chip on the same clock cycle. Data errors are avoided because the chips are fully synchronized. Also, varying synchronization delays caused by synchronization circuits 116 are avoided because master chip 104-1 synchronizes the control signal and sends the synchronized signal to each FSM2 112-2, 112-3, and 112-4 of each chip 104-2, 104-3, and 104-4.

Figure 2:
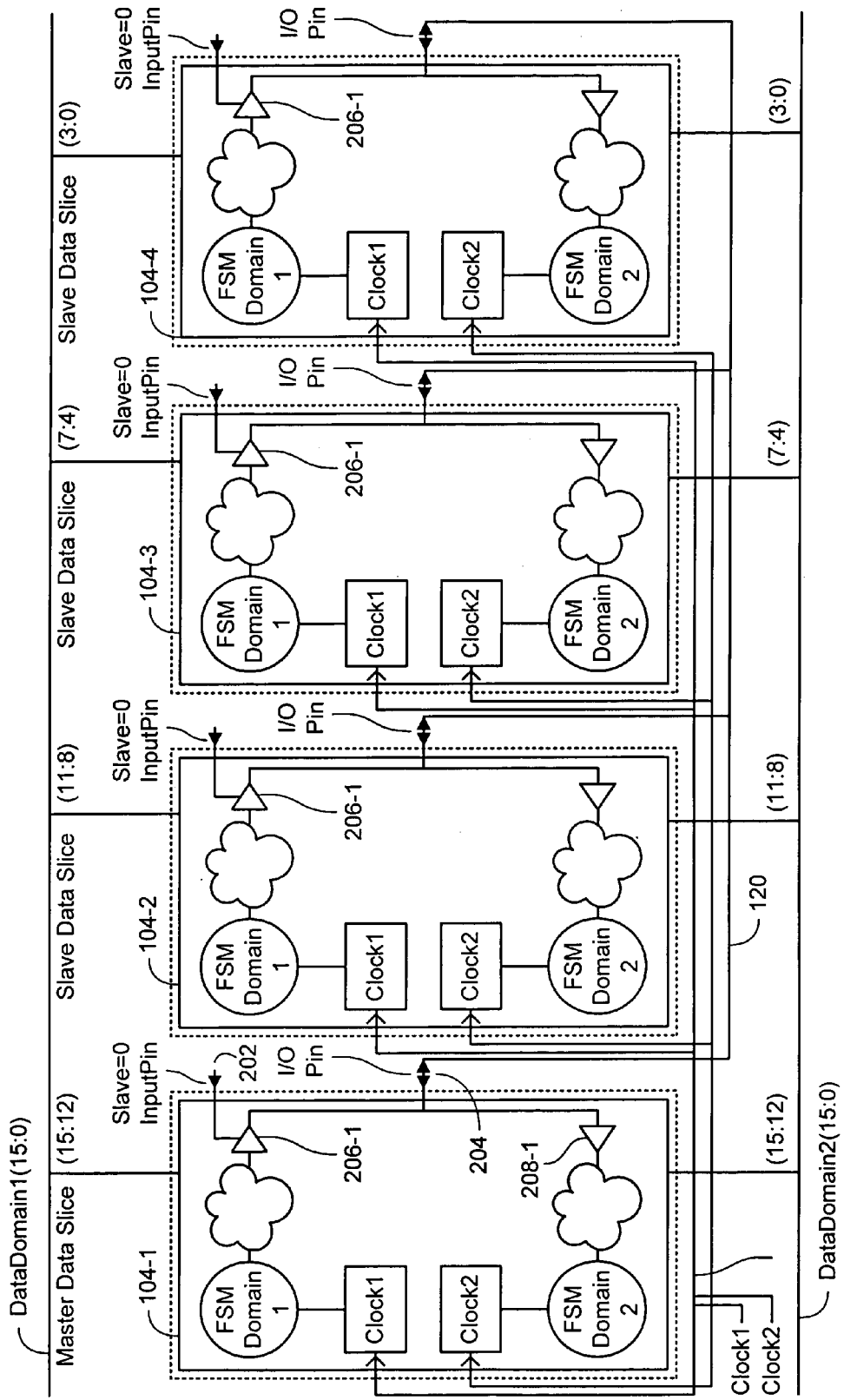
FIG. 2 depicts an embodiment of the bit slice data path design showing the configuration of a master chip and slave chips according to one embodiment of the present invention.

FIG. 2 depicts an embodiment of bit slice data path design 100 showing the configuration of a master chip 104-1 and slave chips 104-2, 104-3, and 104-4 according to one embodiment of the present invention. An input pin 202 and input/output (I/O) pin 204 are provided for each chip. Input pin 202 determines if a chip 104 is a master chip or slave chip. I/O pin 204 is used to route the inter-chip synchronizing signal and is wired to send a signal from the master chip 104-1 to any slave chips 104-2, 104-3, and 104-4.

In one embodiment, if an input pin 202 is set to a first value (e.g., 1), a chip 104 acts as a master chip. If an input pin 202 is set to a second value (e.g., 0), a chip 104 acts as a slave chip. A gate 206 (e.g., a tri-state buffer) is included in each chip 104 and may either enable a synchronized signal to be sent from a FSM1 106 to a FSM2 112 if the chip 104 is a master chip or may not enable any signals to be sent from FSM1 106 to FSM2 112 if the chip 104 is a slave chip. It will be understood that other circuitry may be used in place of gate 206.

I/O pin 204 is wired such that a signal from FSM1 106-1 to FSM2 112-1 in from master chip 104-1 is sent to slave chips 104-2, 104-3, and 104-4. The signal is looped back in master chip 104-1 where signal is received at FSM2 112 at each chip 104 in the same clock cycle. In one embodiment, wire 120 is used to send the signal from master chip 104-1 to slave chips 104-2, 104-3, and 104-4. Connector 120 may be an individual wire from output pin 204 of master chip 104-1 to input pins 204 of slave chips 104-2, 104-3, and 104-4. Alternatively, each slave chip 104-2, 104-3, and 104-4 may be connected to master chip individually using separate outputs on the master chip. In this case, three wires may be used to connect master chip 104-1 to slave chips 104-2, 104-3, and 104-4.

A gate 208 is used to determine whether a synchronization signal should be looped back to a master chip 104-1 or a synchronization signal should be received from master chip 104-1 through a connector 120. If the value of input pin 202 indicates that the chip is a master chip, gate 208 will pass a signal from FSM1 106 to FSM2 112. The signal may be delayed so that it is synchronized with signals sent to slave chips 104-2, 104-3, and 104-4. If the value of input pin 202 indicates that the chip is a slave chip, gate 208 will forward a signal from master chip 104-1. The signal reaches FSM2 112 in the same clock cycle as the looped back signal in master chip 104-1.

Figure 3:
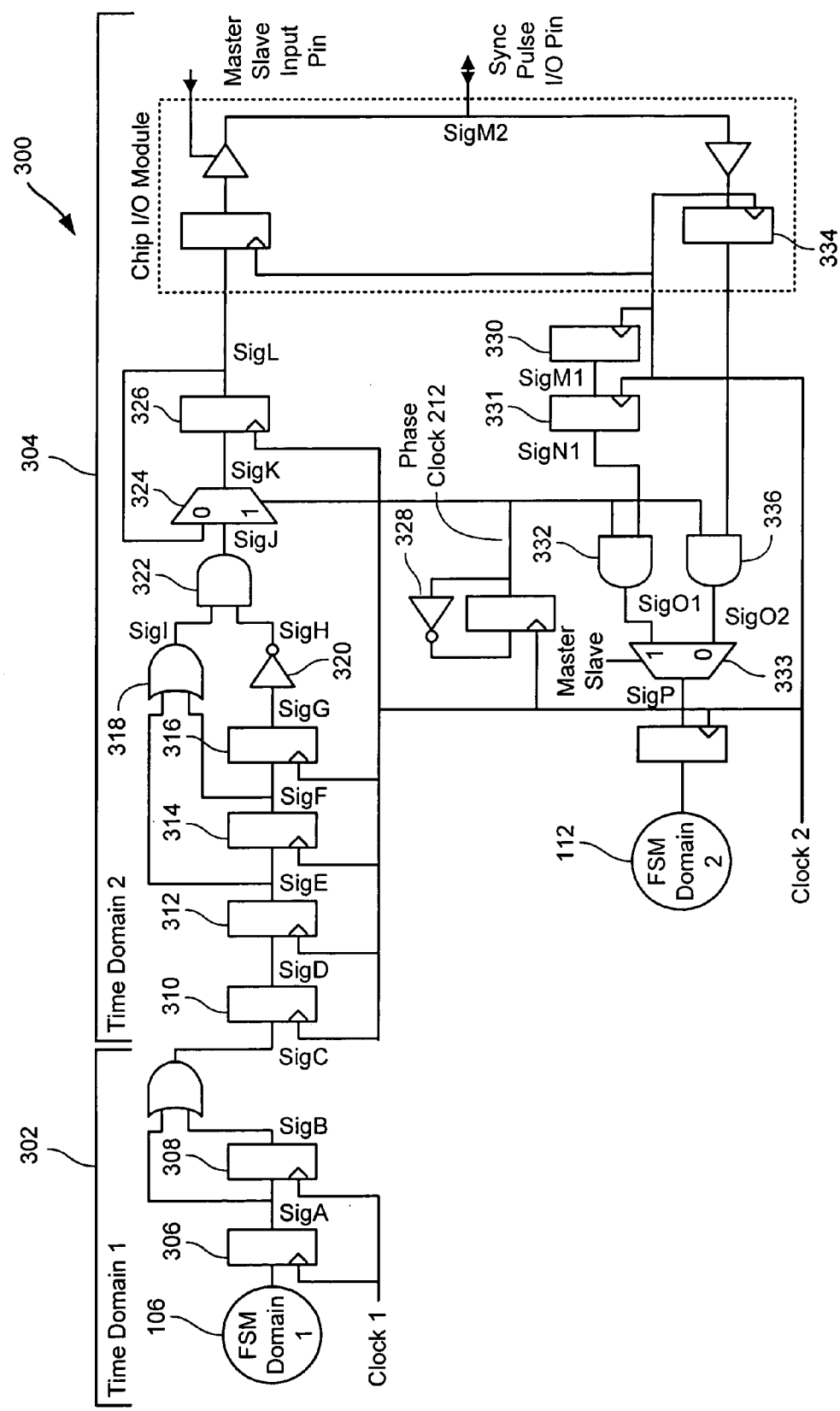
FIG. 3 illustrates a circuit diagram for a chip in the bit slice data design according to one embodiment of the present invention.

FIG. 3 illustrates a circuit diagram 300 for a chip 104 in bit slice data design 100 according to one embodiment of the present invention. As shown, a first time domain 302 and a second time domain 304 are provided. FIG. 3 will be described with reference to the different signals produced at various points in bit slice data path design 100.

FSM1 106 generates a single clock pulse that needs to be synchronized to all chips in bit slice data design 100 and sent to FSM2 112 in time domain 2. Also, the single clock pulse is sent to FSM2 112 in other slave chips.

Flip-flops 306, and 308 are used to increase the single clock pulse provided by FSM1 106 to a two-clock wide pulse. Signal SigA and signal SigB create a two-clock wide pulse signal SigC. Signal SigC is then sent from time domain 1 to time domain 2.

A flip-flop 310 and a flip-flop 312 are used to generate a signal SigE from a signal SigD. Flip flops 310 and 312 are used to synchronize the double clock pulse from a frequency of time domain 1 to a frequency of time domain 2. The synchronization ensures that the double clock pulse will overlap with an edge of CLK2. The clock pulse that has crossed in time domain 2 may be one to three clocks wide in time domain 2 because of the differences in frequency. If the frequency of time domain 2 is faster than the frequency of time domain 1, the clock pulse may be three clocks wide because clock pulses in time domain 2 occur more frequently than clock pulses in time domain 1. If the frequency of time domain 2 is slower than the frequency of time domain 1, the clock pulse my be one clock wide because clock pulses in time domain 2 occur less frequently than clock pulses in time domain 1.

Flip-flop 314, flip-flop 316, gate 318, gate 320, and gate 322 are used to create a clock pulse that is exactly two clocks wide in time domain 2. A signal SigJ is created from signal SigE using a flip-flop 314, a flip-flop 316, a gate 318, and a gate 320. Signal SigE is routed through flip flop 314 to create signal SigF and through flip flop 316 to create signal SigG. Signals SigF and SigG are delayed by a clock cycle. Signal SigE and SigF are also routed through gate 318 to create signal SigI. Signal SigI is a double clock wide pulse. Signal SigJ is routed through a gate 320 (e.g., an inverter) to create a signal SigH, which is an inverted signal of signal SigG. Signal SigH and SigJ are routed through an AND gate 322 to create a two clock wide pulse.

Signal SigL is then synchronized with the clock frequency CLK2 of time domain 2. A signal SigL is produced from a signal SigK using a multiplexer 324, a flip-flop 326, and a phase circuit 328. A phase signal along with the multiplexer 324 and flip-flop 326 is used to sample the two clock wide pulse (signal SigJ) once and produces a phase-aligned two clock wide pulse (SigL).

In one embodiment, because of routing considerations between chips, a two clock pulse instead of a one clock pulse may be desired in order to relax routing constraints. Thus, a two clock pulse signal SigL is generated after the pulse is synchronized to allow for a longer transmission time between chips. Thus, chips may be located farther apart and more time may be allotted for transferring a signal between chips. Also, the connection between chips may be designed with less priority in routing. The longer transmission time means more options for designing the connection may exist.

In one embodiment, the first part of the signal SigL is not used because it may not be reliable. The first part is not used because the second part is the delayed part that is created from the double clock pulse. Thus, if the first part is used, no advantage is gained in time because the first part is the same part as a single clock pulse.

Signal SigL splits off into two paths depending on if a chip is a master or a slave chip. One path signal SigM2 is used to drive the signal off the chip to other signaling devices. The other signal path signal SigM1 is an internal loop back inside the master chip. Both signals SigM2 and SigM1 have identical timing so that both signals arrive at FSM2 112 the same time for each chip.

The processing of a master chip will now be described. Signal SigL is delayed a single clock cycle using a flip-flop 330 to generate a signal SigM1. Signal SigM1 is then delayed another clock cycle to generate a signal SigN1. Signal L1 is delayed two clock cycles to compensate for the delay in transmitting the signal to the slave chips. Signal SigN1 and signal SigN2 (in the slave chip) have the same timing.

A signal SigO1 is a single clock pulse that is generated from signal SigN1. A phase along with an AND gate 332 is used to sample the second part of the two clock wide synchronization pulse, signal SigN1. This converts the two clock pulse into a one clock pulse signal SigO1 in time domain 2.

A multiplexer 333 is then used to determine whether an internal loop back signal or an external signal should be read as signal SigP. If input pin 202 indicates that this chip is a master chip, multiplexer 333 will read signal SigO1. If input pin 202 indicates that this chip is a slave chip, multiplexer 333 will read signal SigO2. Thus, the same circuitry may be designed for both master and slave chips. Pin 202 is set differently for the master and slave chips and determines whether a looped back signal from the master chip is used (e.g., in the master chip) or a signal received from the master chip is used (e.g., in the slave chip).

Signal SigP, in the master chip, is then received in FSM2 112 in the same clock cycle as a signal SigP is received in a slave chip. Accordingly, a single clock pulse in time domain 2 has then been synchronized to exactly the same clock in all chips.

The process of receiving a signal in a slave chip will now be described. Signal SigM2 is outputted on connector 120 to a slave chip. Input pin 202 is set in the master chip to a value that outputs signal SigL though I/O pin 204. Also, in the slave chip, input pin 202 is set to a value where a signal SigL is not outputted through I/O pin 204. Rather, the slave chip is configured to receive a signal SigM from the master chip through I/O pin 204.

The signal SigM2 is received and routed through a flip-flop 334 to create a signal SigN2. Signal SigN2 is in the same clock cycle as SigN1 in the master chip.

A signal SigO2 is a single clock pulse that is generated from signal SigN2. A phase along with an AND gate 336 is used to sample the second part of the two clock wide synchronization pulse, signal SigN2. This converts the two clock pulse into a one clock pulse signal SigO2 in time domain 2.

Signal SigO2 is then input into multiplexer 333, which has an input pin set a value that indicates this chip is a slave chip. Thus, signal SigO2 is read instead of signal SigO1. Signal SigP is a single clock pulse that is received in the slave chip in the same cycle that a signal SigP is received in the master chip.

In one embodiment, circuit diagram 300 is designed to work with a clock frequency relationship of (CLK1*2) >CLK2. If the above relation ship is not true, an N number of flip-flops may be added to diagram 300 in the first time domain. For example, the flip-flops may be added with an N-input OR gate in time domain 1. The clock frequency relationship then becomes (CLK1*N)>CLK2. In one embodiment, the pulse signal from FSM1 106 is wide enough where the pulse may overlap a pulse in the second time domain.

Figure 4:
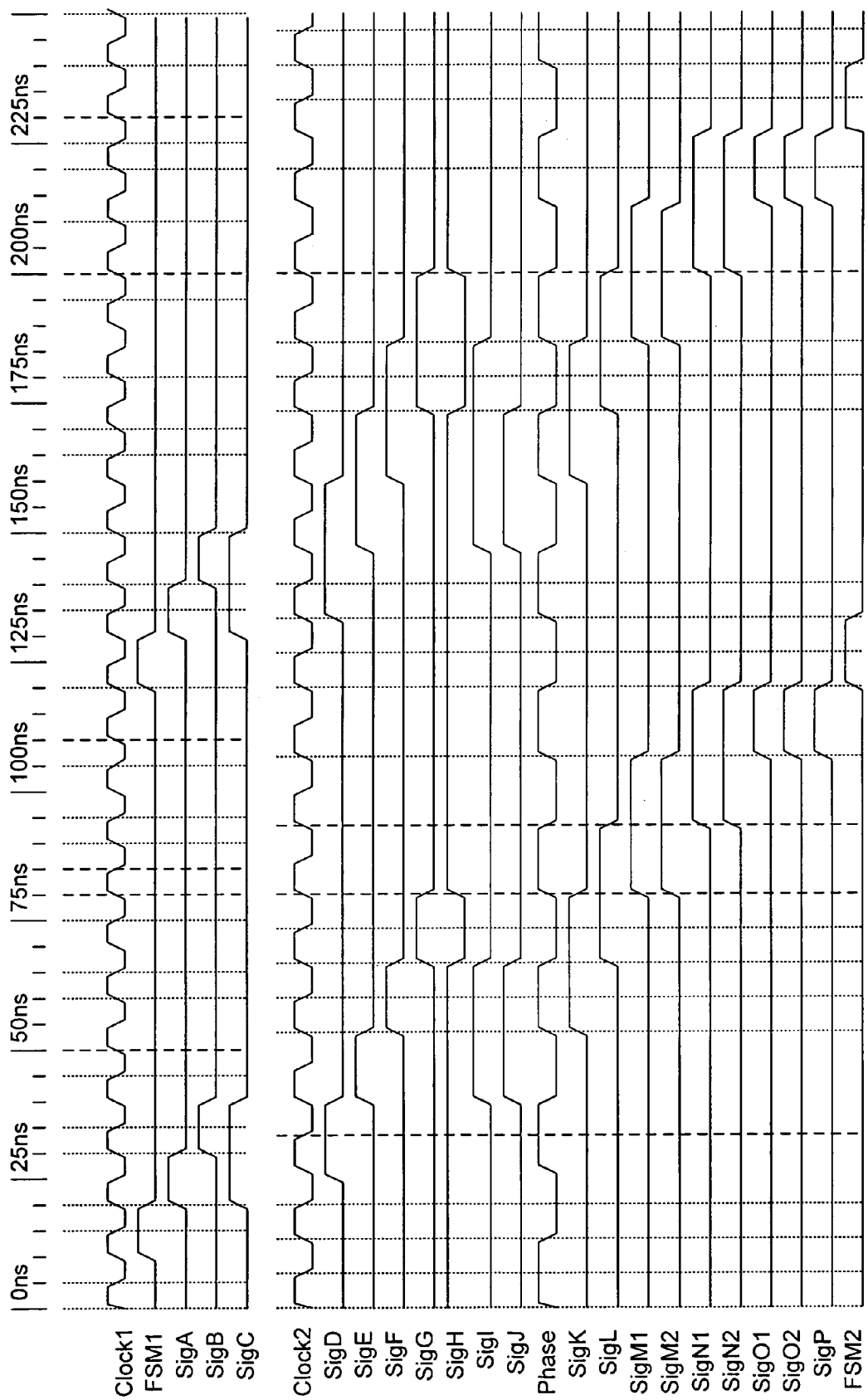
FIG. 4 illustrates a timing diagram for circuitry shown in FIG. 3 according to one embodiment of the present invention.

FIG. 4 illustrates a timing diagram for circuitry shown in FIG. 3 according to one embodiment of the present invention. The timing diagram is where a clock CLK1 is faster than a clock CLK2.

Figure 5:
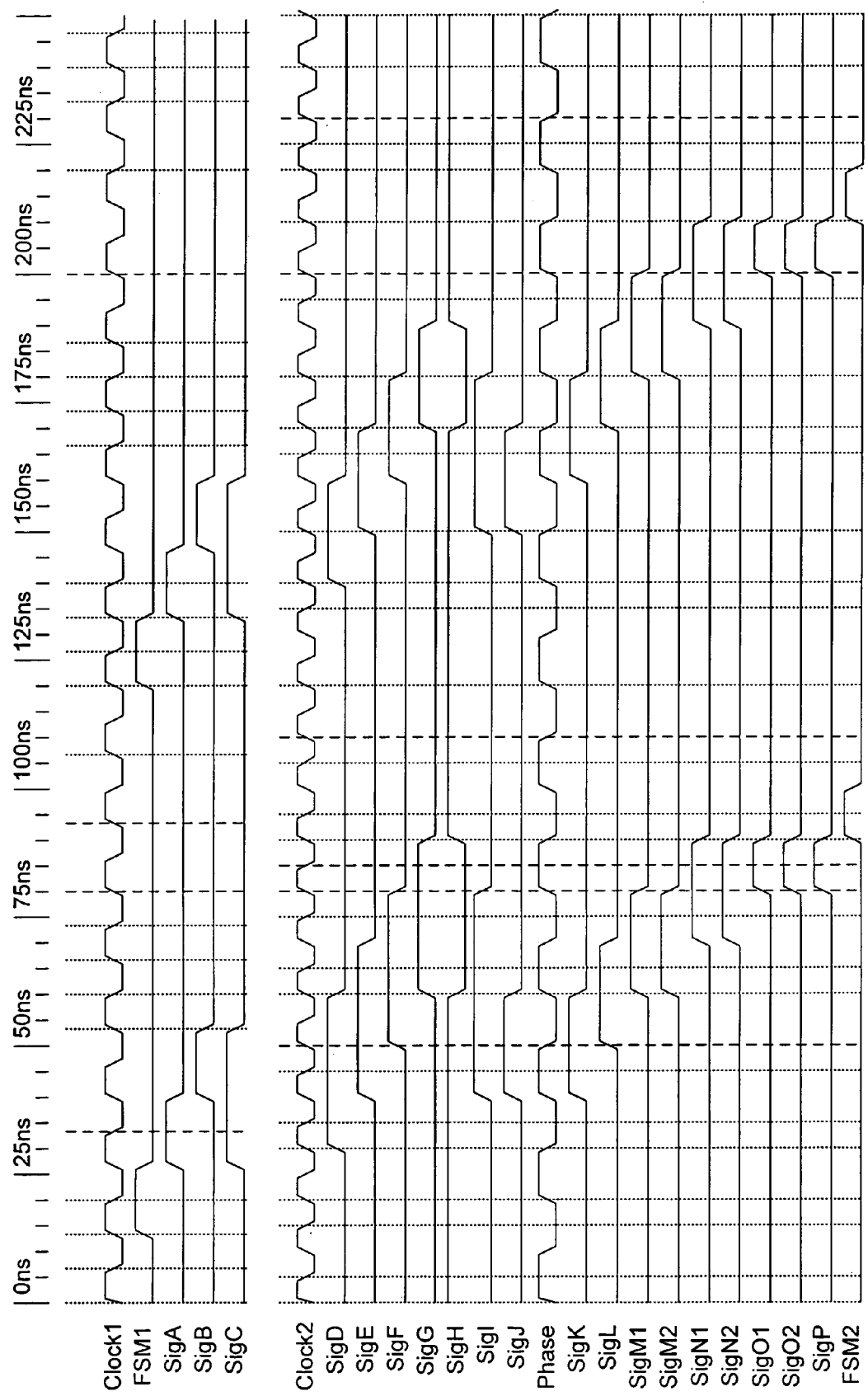
FIG. 5 illustrates a timing diagram for circuitry shown in FIG. 3 according to one embodiment of the present invention.

FIG. 5 illustrates a timing diagram for circuitry shown in FIG. 3 according to one embodiment of the present invention. The timing diagram is where a clock CLK1 is slower than a clock CLK2.

Accordingly, embodiments in the present invention enable a synchronization signal to be sent from a first time domain operating in a first frequency to a second time domain operating in a second frequency where the synchronization signal will arrive in the second time domain for all chips in a bit slice data design in the same clock cycle. A master chip generates a signal that is sent from the first time domain to a second time domain through a synchronization circuit. The signal is synchronized in the master chip and sent to the slave chips through a common wire. The signal is also looped back in the master chip with a delay so that the loop back signal will arrive at a finite state machine in a second time domain in the same clock cycle as the synchronized signal arrives at a finite state machine in the second time domain in the slave chips.

Embodiments of the present invention include many advantages. For example, the differentiating time delays that may occur if synchronization circuits for multiple chips are used are avoided because a signal is synchronized in a master chip and not in any slave chips. Thus, the time the synchronization takes does not matter because after the synchronization occurs, the same signal is sent to other slave chips. Thus, variations between synchronization times are removed.

Also, the circuitry in each chip is designed to alleviate transmission times through a wire connecting the master and the slave chips. Additionally, the circuitry used in each chip allows a master and slave chip to be designed substantially identically. An input pin that designates whether a chip is a master chip or a slave chip is set as a first or second value. Once a value is set, a chip will act as a master chip or a slave chip. Thus, different chips do not have to be designed and processed.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A bit slice circuit comprising:
   a data bus;
   a plurality of chips coupled to the data bus, the plurality of chips configured to simultaneously process a slice of data for the data bus, the plurality of chips comprising:
   a master chip comprising:
      a first time domain circuit operating at a first frequency;
      a second time domain circuit operating at a second frequency;
      a synchronizing circuit configured to synchronize a signal from the first time domain in the first frequency to the second time domain in the second frequency;
   one or more slave chips comprising:
      the second time domain circuit operating at the second frequency,
   wherein the master chip is configured to send the synchronized signal to one or more slave chips such that the synchronized signal is received in the second time domain circuit for the master chip and the second time domain circuit in one or more slave chips in the same clock cycle.

2. The bit slice circuit of claim 1, wherein the one or more slave chips comprise:
   the first time domain circuit operating at a first frequency; and
   the synchronizing circuit configured to synchronize a signal from the first time domain in the first frequency to the second time domain in the second frequency, wherein the first time domain circuit and the synchronizing circuit are turned off.

3. The bit slice circuit of claim 1, further comprising a connection wire that routes the synchronized signal from the master chip to the one or more slave chips.

4. The bit slice circuit of claim 3, wherein the plurality of chips comprise a phase circuit that is used to double a width of the synchronized signal before the signal is sent to the one or more slave chips through the connection wire.

5. The bit slice circuit of claim 4, wherein the phase circuit is used to sample a second half of the doubled synchronized signal after the signal is received through the connection wire at the one or more slave chips.

6. The bit slice circuit of claim 1, wherein the synchronized signal received in the second time domain circuit for the master chip is delayed so that the synchronized signal is received in the same clock cycle as the synchronized signal received by the second time domain circuit in the one or more slave chips.

7. The bit slice circuit of claim 1, wherein the master chip and the one or more slave chips comprises an input pin, wherein the input pin is set to a first value for the master chip and a second value for the one or more slave chips.

8. The bit slice circuit of claim 7, wherein the master chip and one or more slave chips include the same circuitry, wherein the input determines if a chip in the plurality of chips is a master chip or a slave chip.

9. The bit slice circuit of claim 1, wherein the master chip and the one or more slave chips comprise a memory, wherein the data bus comprises a first data bus and a second data bus, the data being read in from a first data bus and read out to a second data bus.

10. A bit slice circuit comprising:
   a plurality of chips configured to simultaneously process a slice of data for a data bus, the chips including substantially similar circuitry, the plurality of chips comprising:
      a first time domain circuit operating at a first frequency;
      a second time domain circuit operating at a second frequency;
      a synchronization circuit configured to synchronize a signal from the first time domain in the first frequency to the second time domain in the second frequency; and
      an input pin configured to be set to a first or second value, wherein the plurality of chips comprise a master chip with an input pin set to the first value and one or more slave chips with an input pin set to the second value, wherein the master chip is configured to send the synchronized signal to one or more slave chips such that the synchronized signal is received in the second time domain circuit for the master chip and the second time domain circuit in one or more slave chips in the same clock cycle.

11. The bit slice circuit of claim 10, further comprising a connection wire that routes the synchronized signal from the master chip to the one or more slave chips.

12. The bit slice circuit of claim 11, wherein the plurality of chips comprise a phase circuit that is used to double a width of the synchronized signal before the signal is sent to the one or more slave chips through the connection wire.

13. The bit slice circuit of claim 12, wherein the phase circuit is used to sample a second half of the doubled synchronized signal after the signal is received through the connection wire at the one or more slave chips.

14. The bit slice circuit of claim 10, wherein the first time domain circuit comprises a first finite state machine and the second time domain circuit comprises a second finite state machine, the first finite state machine sending the signal that is synchronized for the second finite state machine.

15. The bit slice circuit of claim 10, wherein the input pin determines whether the synchronization signal from the first time domain is received from the master chip if the value is set to the second value or if the synchronization signal is received from the first time domain circuit if the value is set to the first value.

16. The bit slice circuit of claim 10, wherein the master chip and the one or more slave chips comprise a memory, wherein the data bus comprises a first data bus and a second data bus, the data being read in from a first data bus and read out to a second data bus.

17. The bit slice circuit of claim 10, wherein the synchronized signal received in the second time domain circuit for the master chip is delayed so that the synchronized signal is received in the same clock cycle as the synchronized signal received by the second time domain circuit in the one or more slave chips.

18. The bit slice circuit of claim 10, wherein signals from the first time domain and the synchronization circuit of the one or more slave chips are not routed to the second time domain circuit.

* * * * *